United States Patent [19]
Richiardone et al.

[11] Patent Number: 5,667,537
[45] Date of Patent: Sep. 16, 1997

[54] FORMING A LEAD ACID BIPOLAR BATTERY ELECTRODE HAVING A PERIPHERAL SEALING FRAME AND RELEVANT PRODUCT

[75] Inventors: Valter Richiardone, Milan; Furio Rossetti, Cuorgne; Marco Zampolli, Santena; Paolo Tosco, Turin; Francesco D'Oria, Milan; Mario Vitali, Cassina de'Pecchi; Aurelio Buscotti, Cerro Maggiore; Franco Mostarda, Bobbiate; Luigi Borri, Legnano, all of Italy

[73] Assignees: Edison Termoelettrica, S.P.A., Trofarello; CSI Ricera Applicata Montedison S.r.L., Bollate, both of Italy

[21] Appl. No.: 580,426

[22] Filed: Dec. 27, 1995

[51] Int. Cl.⁶ .................. H01M 4/04; H01M 10/04
[52] U.S. Cl. .................. 29/623.2; 429/210; 429/185
[58] Field of Search .................. 29/623.1, 623.4, 29/623.2; 429/210, 174, 185; 264/272.21

[56] References Cited

U.S. PATENT DOCUMENTS

| | | | |
|---|---|---|---|
| 4,164,088 | 8/1979 | Shropshire et al. | 29/623.1 |
| 4,275,130 | 6/1981 | Bippel et al. | 429/210 |
| 4,900,643 | 2/1990 | Eskra et al. | 429/241 |
| 5,068,160 | 11/1991 | Clough et al. | 429/72 |
| 5,326,656 | 7/1994 | Meadows et al. | 429/178 |

FOREIGN PATENT DOCUMENTS

| | | |
|---|---|---|
| 20370 | 11/1917 | France . |
| 2171208 | 9/1973 | France . |
| 646549 | 5/1937 | Germany . |
| 58-102470 | 6/1983 | Japan . |
| 58-102471 | 6/1983 | Japan . |
| 63-274055 | 11/1988 | Japan . |
| 1425030 | 2/1976 | United Kingdom . |
| WO94/29923 | 12/1994 | WIPO . |

*Primary Examiner*—Anthony Skapars
*Attorney, Agent, or Firm*—Merchant, Gould, Smith, Edell, Welter & Schmidt, P.A.

[57] ABSTRACT

The method of forming the battery electrode includes providing two complementary half-frames of plastic material each having a substantially flat face delimited by an outer closed line and an inner closed line, where the inner and outer closed lines enclose the perimeter of the plate. Next, a plate is placed within a pressure forming mold between the two half-frames so as to enclose the perimeter of the plate between the outer closed lines and the inner closed lines. Then the mold is closed and heated to a temperature causing the plastic material of the half-frames to fuse and adhere continuously along the entire perimeter of the plate.

6 Claims, 1 Drawing Sheet

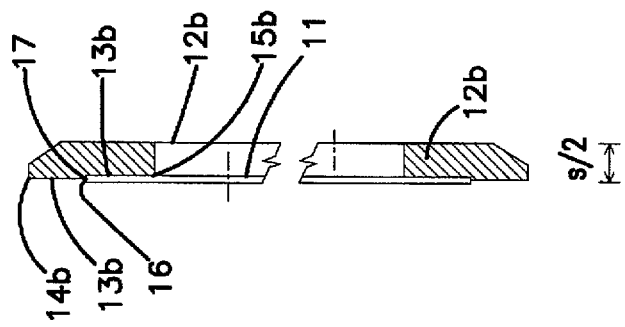
FIG. 4
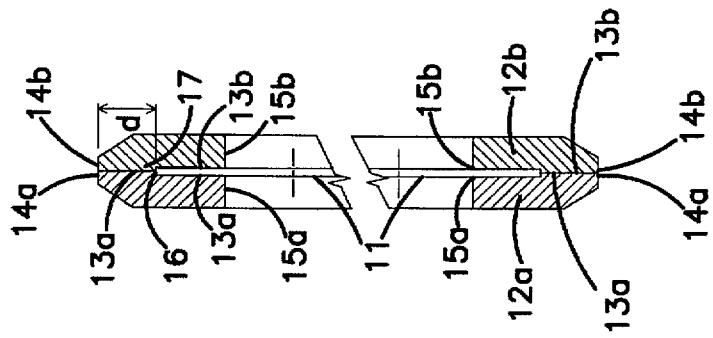
FIG. 2
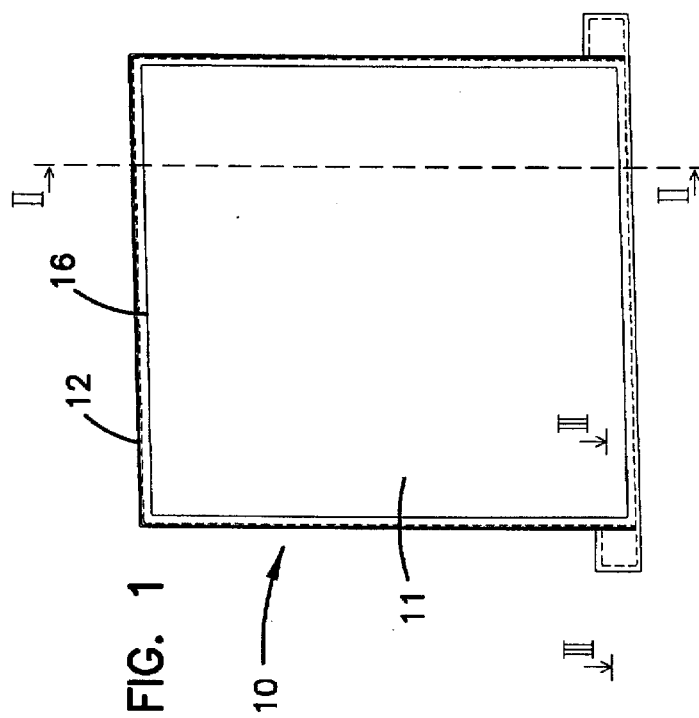
FIG. 1
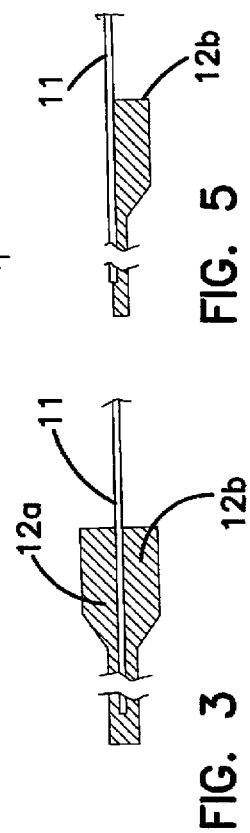
FIG. 5
FIG. 3

FORMING A LEAD ACID BIPOLAR BATTERY ELECTRODE HAVING A PERIPHERAL SEALING FRAME AND RELEVANT PRODUCT

BACKGROUND OF THE INVENTION

1. Field of the Invention

The present invention refers to hermetically sealed lead acid bipolar batteries. More specifically, the invention relates to a method of coupling a plastic frame to the peripheral edge of an electrode plate, so that the latter constitutes a modular peripheral member providing junction to equal adjacent members for hermetically sealing the cells of the battery.

2. Description of Prior Art

Several prior art documents disclose a typical arrangement comprising a frame of plastic insulating material coupled to an electrically conductive polymer plate acting as a substrate for active compounds and dividing the cells.

The frame is applied along the peripheral edge of the generally rectangular plate, defining the working surface of the electrochemical cell.

The frame supports the cell partitioning members and forms a wall delimiting the space between the electrodes and providing sealing and Junction of the single cells with adjacent cells. Also, the frame provides a liquid and air-tight hermetical seal with respect to the exterior.

The following are known methods for coupling a peripheral frame to the electrode plate:

a) forming a frame by injection or pressure molding.

Along the inner side of the frame a peripheral recess is formed for accommodating the outer edge of the electrode plate. The two parts are fixed together by a tongue and slot arrangement, as disclosed in U.S. Pat. No. 4,900,643. As an alternative, the peripheral edge of the plate joined to the walls of the slot by heat welding or ultrasonic welding or adhesives, as described in U.S. Pat. No. 4,164,068.

b) the frame is fixed to the plate surface by mold injection, simultaneously providing positioning and sealing of the frame on the central plate, as discussed in both of the cited references.

The first of the two cited methods, providing a mechanical junction, encounters a problem in that it does not guarantee hermetic seal. In addition, a second drawback derives from the application of adhesives or final heat treatments for welding the edge of the plate to the recesses formed in the body of an outer mounting frame. The final result is not reliable and also involves rather complex operations.

The second method involves deformation problems at the edges of the plates and insufficient adhesion may result when conventional injection molding is carried out, as a consequence of high working pressure and insufficient contact time between the parts to be welded.

SUMMARY OF THE INVENTION

It is an object of the present invention to provide a method which, unlike conventional bipolar lead acid systems, uses pressure molding as a method of coupling the peripheral frame to the electrode plate with an adhesion capable of providing hermetically sealing the cells.

It is another object of the present invention to provide a peripheral frame of regular shape, particularly without deforming the edges of the plate.

The present invention relates to the construction of hermetically sealed lead acid bipolar batteries, and more particularly refers to a method of applying a peripheral sealing member to the surface of an electrode plate. The sealing member is in the form of a frame of a polyolefin based material comprising polar units to chemically bind to the conductive substrate.

The said battery is obtained by joining a series of intermediate electrodes which are interposed between terminal current monopolar collectors located at the ends of the stack. The constructional arrangement provides alternate polarities, the single electrodes being separated by glass microfiber layers impregnated with electrolyte, as disclosed in U.S. Pat. No. 5,288,566.

Each electrode is a flat surface plate of electrically conductive material having a substrate of active compound on either face, except for the end plates, which have the active compound on one face only. The plates also act as cell separating members.

The active compound does not cover the entire surface of the plate, but leaves a peripheral edge free for applying thereupon suitable sealing members in the form of plastic weldable frames.

With the goal of sealing around the edges of the electrodes of the battery, the frame must adhere to the surface of the plates, have a geometrically regular shape or modularity, whereby junctions between adjacent sealing members is made possible.

According to the present invention, the method of coupling the plastic frame to the edge of the plate satisfies the above requirements and obviates the cited prior art inconveniences. In summary, the new method comprises providing independent half-frames previously, formed and then pressure molding same to the surface of the electrode plate.

In accordance with the invention, there is provided a method as claimed in claim 1.

BRIEF DESCRIPTION OF THE DRAWINGS

In order that the present invention may be well understood there will now be described a preferred embodiment thereof, given by way of example, reference being made to the accompanying drawings, in which:

FIG. 1 is a schematic front view of a bipolar electrode having a peripheral frame applied thereto through the method of the present invention;

FIG. 2 is a schematic sectional view, to an enlarged scale, taken along the line II—II of FIG. 1;

FIG. 3 is a schematic sectional view, to an enlarged scale, taken along the line III—III of FIG. 1; and FIGS. 4 and 5 are schematic sectional views to an enlarged scale similar to those of FIGS. 2 and 3, respectively, referring to a monopolar electrode.

DETAILED DESCRIPTION OF THE INVENTION

With reference initially to FIGS. 1, 2 and 3, numeral 10 designates overall a bipolar electrode of a battery. Electrode 10 is a substantially rectangular plate 11. Securely fixed to the outer edge 16 of plate 11 is a peripheral, continuous frame 12.

Plate 11, of conventional kind, can either be made of lead or other electrically conductive material such as a polymer (for example polyaniline, polyparaphenylene, polypyrrole, etc.) or ceramic (for example titanium carbide, molybdenum silicide, etc.).

Peripheral frame 12 has the following purposes of:

stiffening the electrically conductive plate 11;

sealing the edge of the plate with respect to the other electrodes forming the battery stack;

acting as a reference element during the phase of applying a substrate of active compound.

Referring particularly to FIG. 2, according to the present invention frame 12 is obtained by pressure molding two plastic, complementary half-frames 12a, 12b separately obtained by injection molding in a separate mold. Preferably, half-frames 12a, 12b are made of a polyolefin based material.

As shown in FIG. 2, two preferably identical half-frames 12a, 12b, are fitted to either face of a plate 11 symmetrically with respect to the central plane of the plate. The length and width of the half-frames must be dimensioned so that each forms a substantially flat face 13a, 13b copying the outer profile of electrically conductive plate 11. Faces 13a, 13b may provide a slight step 17 in their outer part. Each face 13a, 13b is respectively delimited by an outer closed line 14a, 14b, and an inner closed line 15a, 15b. The peripheral edge 16 of plate 11 is completely enclosed within outer lines 14a, 14b and inner lines 15a, 15b. Particularly, the outer lines 14a, 14b exceed edge 16 by a predetermined length "d" when the half-frames are brought near the plate. When provided, step 17 facilitates correct positioning of plate 11 relative to the half-frame.

The thickness s/2 of each half-frame determines the pitch or module according to which the stacked electrodes are spaced apart in the battery.

The frame forming method comprises pressure welding of the two half-frames in a mold (not shown) for pressure forming, the mold being previously brought to a suitable temperature. Once the half-frames 12a, 12b are provided, first half-frame 12a and a plate 11 are successively located in the mold. In the case of a bipolar electrode being formed, a second half-frame 12b is also fitted in the mold so as to sandwich the plate between the two half-frames, as shown in FIG. 2.

Instead, in the case of a terminal monopolar electrode, only one half-frame is fitted in the mold, and then a plate, as shown in FIG. 4.

The subsequent steps comprise the following operations:

closing the mold with a minimum pressure;

heating to a temperature causing the plastic material of the frames to fuse and cause this material to adhere continuously to the material forming the plate along the entire perimeter thereof;

applying maximum pressure;

cooling the mold to a drawing temperature;

opening the mold and drawing a finished workpiece consisting of an electrode 10 with a peripheral frame 12.

Advantageously, to allow working of bipolar electrodes (having two half-frames) as well as monopolar electrodes (having one half-frame), the upper punch (not shown) will be provided with an interchangeable insert.

As will be apparent, the method of the present invention obviates the above discussed limits and inconveniences of prior art. Further, due to the pre-formed half-frames, all problems concerning the amount of the plastic material to be molded to the electrode are eliminated. In addition, the half-frames can be positioned in the mold easily and accurately.

We claim:

1. A method of forming a continuous peripheral frame integral with a plate of electrically conductive material constituting an electrode of a bipolar battery, in which the frame constitutes a modular peripheral member for joining to equal adjacent members, thereby hermetically sealing the cells of the battery, the method comprising the steps of:

a) providing two pro-formed complementary half-frames of a plastic material each having a flat face delimited by an outer closed line and an inner closed line, said inner and outer closed lines enclosing the perimeter of the plate;

b) placing a conductive plate within a pre-heated pressure forming mold, said conductive plate being interposed between the flat faces of the two half-frames to grip a perimeter of the conductive plate between the outer closed lanes and the inner closed lines;

c) closing the mold;

d) heating the mold to a temperature to cause the plastic material of the flat faces of the half-frames to fuse and adhere to the conductive plate along an entire perimeter of the conductive plane;

e) applying pressure to squeeze the half-frames together;

f) cooling the mold;

g) opening the mold and drawing a finished workpiece including an electrode with a peripheral frame.

2. The method of claim 1, wherein the plastic material is a polyolefin based material comprising polar units to chemically bind to the conductive plate.

3. The method of claim 1, wherein the half-frames are disposed to be symmetrical about to a central plane of the conductive plate.

4. The method of claim 1, wherein the flat faces comprise outer parts forming steps for accommodating the conductive plate.

5. An electrode for a bipolar battery, of the type consisting of an electrically conductive plate, a peripheral, continuous frame being securely fixed to the outer edge of the plate, said frame constituting a modular peripheral member providing junction to equal adjacent members for hermetically sealing the cells of the battery, the electrode being formed from the method comprising the steps of:

a) providing two pro-formed complementary half-frames of a plastic material each having a flat face delimited by an outer closed line and an inner closed line, said inner and outer closed lines enclosing the perimeter of the plate;

b) placing a conductive plate within a pre-heated pressure forming mold, said conductive plate being interposed between the flat faces of the two half-frames to enclose a perimeter of the conductive plate between the outer closed lines and the inner closed lines;

c) closing the mold;

d) heating the mold to a temperature to cause the plastic material of the half-frames of the flat faces of the half frames to fuse and adhere to the conductive plate along an entire perimeter of the conductive plate;

e) applying pressure;

f) cooling the mold to a drawing temperature;

g) opening the mold and drawing a finished workpiece including an electrode with a peripheral frame.

6. A method of forming a continuous peripheral frame integral with a plate of electrically conductive material adapted to constitute an electrode of a bipolar battery, in which the frame constitutes a modular peripheral member for joining to equal adjacent members, thereby hermetically sealing the cells of the battery, the method comprising the steps of:

providing two pro-formed complementary half-frames of a plastic material each having a flat face delimited by an outer closed line and an inner closed line, said inner and outer closed lines enclosing the perimeter of the plate, wherein the flat faces comprise outer parts forming steps for accommodating the conductive plate;

placing a conductive plate within a pre-heated pressure forming mold, said conductive plate being interposed between the flat faces of the two half-frames to grip a perimeter of the conductive plate between the outer closed lines and the inner closed lines, the half-frames being symmetrical about the conductive plate;

closing the mold;

heating the mold to a temperature to cause the plastic material of the flat faces of the half-frames to fuse and adhere to the conductive plate along an entire perimeter of the conductive plate;

applying pressure to squeeze the half-frames together;

cooling the mold;

opening the mold and drawing a finished workpiece including an electrode with a peripheral frame.

* * * * *

UNITED STATES PATENT AND TRADEMARK OFFICE
CERTIFICATE OF CORRECTION

PATENT NO. : 5,667,537
DATED : SEPTEMBER 16, 1997
INVENTOR(S) : RICHARDONE ET AL.

It is certified that error appears in the above-identified patent and that said Letters Patent is hereby corrected as shown below: ON THE TITLE PAGE:

After item [73], please add item —[30] Foreign Application Priority Data December 30, 1994 [IT] TO94A001096—.

In column 1, line 37, insert —is— after the word "plate".

In column 2, line 6, delete "said" after the word "The".

In column 3, line 52, "consisting of" should read —having—.

In column 4, line 14, "lanes" should read —lines—.

In column 4, line 19, "plane" should read —plate—.

In column 5, line 1, "pro-formed" should read —pre-formed—.

Signed and Sealed this

Twenty-third Day of February, 1999

Attest:

Q. TODD DICKINSON

Attesting Officer

Acting Commissioner of Patents and Trademarks